(12) United States Patent
Cuvelier

(10) Patent No.: US 7,931,723 B2
(45) Date of Patent: Apr. 26, 2011

(54) FILTER ASSEMBLY WITH PLEATED MEDIA POCKETS, AND METHODS

(75) Inventor: Leon Robert Cuvelier, Hamme-Mille (BE)

(73) Assignee: Donaldson Company, Inc., Minneapolis, MN (US)

( * ) Notice: Subject to any disclaimer, the term of this patent is extended or adjusted under 35 U.S.C. 154(b) by 1055 days.

(21) Appl. No.: 11/683,287

(22) Filed: Mar. 7, 2007

(65) Prior Publication Data

US 2007/0209343 A1 Sep. 13, 2007

Related U.S. Application Data

(60) Provisional application No. 60/743,443, filed on Mar. 9, 2006.

(51) Int. Cl.
*B01D 59/00* (2006.01)
(52) U.S. Cl. ............... 55/484; 55/432; 55/491; 55/497; 55/521; 55/529; 95/92; 95/210; 210/493.1
(58) Field of Classification Search ............. 55/479, 55/498, 482, 484, 497, 521, 529, 432, 491; 210/493.1–493.5; 95/95, 210
See application file for complete search history.

(56) References Cited

U.S. PATENT DOCUMENTS

| | | |
|---|---|---|
| 4,008,060 A | 2/1977 | Andreae |
| 4,640,779 A | 2/1987 | Taki et al. |
| 4,655,921 A | 4/1987 | Fujimoto |
| 4,673,503 A | 6/1987 | Fujimoto |
| 4,738,778 A | 4/1988 | Taki et al. |
| 4,746,432 A | 5/1988 | Taki et al. |
| 4,799,944 A | 1/1989 | Dixon |
| 5,043,000 A | 8/1991 | Kadoya |
| 5,051,118 A | 9/1991 | Andreae |
| 5,120,296 A | 6/1992 | Yamaguchi et al. |
| 5,174,896 A | 12/1992 | Harms, II |
| 5,320,657 A * | 6/1994 | Adams ........................ 55/463 |
| 5,512,075 A | 4/1996 | Ninomiya et al. |
| 5,674,302 A | 10/1997 | Nakayama et al. |
| 6,152,979 A * | 11/2000 | Cappuyns ................... 55/385.3 |
| 6,312,489 B1 | 11/2001 | Ernst et al. |
| 6,315,130 B1 * | 11/2001 | Olsen ......................... 210/490 |
| 6,336,946 B1 | 1/2002 | Adams et al. |
| 6,398,836 B1 * | 6/2002 | Frankle ....................... 55/484 |
| 6,585,793 B2 | 7/2003 | Richerson et al. |
| 6,598,749 B2 | 7/2003 | Paul et al. |
| 7,648,546 B2 * | 1/2010 | Haberkamp et al. ............ 55/521 |
| 2003/0024872 A1 | 2/2003 | Muzik et al. |
| 2005/0045553 A1 | 3/2005 | Muzik et al. |
| 2005/0144916 A1 | 7/2005 | Adamek et al. |

FOREIGN PATENT DOCUMENTS

| | | |
|---|---|---|
| GB | 725066 | 3/1955 |
| WO | WO 02/22230 A2 | 3/2002 |
| WO | WO 2005/037408 A1 | 4/2005 |

* cited by examiner

*Primary Examiner* — Frank M Lawrence
*Assistant Examiner* — Karla Hawkins
(74) *Attorney, Agent, or Firm* — Merchant & Gould P.C.

(57) ABSTRACT

A panel filter for removal of contaminants from a gas, the panel filter having at least one V-pocket formed of two halves, each half composed of multiple pleats of filter media. The pleats extend generally parallel, often at an angle of less than 5 degrees or even less than 1 degree, to the overall filtration path, so that air or gas to the filtered passes through the pleats in a generally straight manner, with minimal bends. Each pleat has two legs of different length. The panel filter provides improved dust collection and retention while restricting pressure drop.

18 Claims, 7 Drawing Sheets

FILTER ASSEMBLY WITH PLEATED MEDIA POCKETS, AND METHODS

This application claims priority under 35 U.S.C. §119(e) to U.S. provisional application Ser. No. 60/743,443 filed on Mar. 9, 2006, incorporated by reference herein.

FIELD

The present invention relates to air or gas panel filters having filter media pockets. In particular, the invention relates to air or gas panel filters having pockets formed by pleated filter media.

BACKGROUND

Panel air filters having a multiple pocket configuration are well known and are commercially available from various sources such as Donaldson Company, Inc., Pall Corp., Tri-Dim Filter Corp., and Koch Filter Corp. An example of a V-pocket panel filter is the product generally known as "Pocket Filter" from Donaldson Company, Inc., having parts nos. P03-0204, P03-0205, P03-0256, and P03-0257. Such pocket filters are three-dimensional panel filters have low pressure drop therethrough. They are termed "pocket filters" due to the multiple pockets formed by the filter media.

It is well established in the filter industry that by increasing the amount of filter media, additional media surface area can be packaged into a given volume, thereby increasing dust collection and lowering face velocity. Pleating is a well known mode for increasing the amount of media; decreasing pleat height and increasing pleat density further increases the amount of media.

Such is the basis for pleated pocket panel filters. An example of such a product is available from Donaldson Company, Inc. under the product designation "Mini-Pleat". A disadvantage, however, is an increase in pressure drop, across the media, that results from the high dust collection.

A partial section of another known pleated pocket panel filter, having a constant pleat height, is shown in FIG. 1. The typical air flow path through the panel pockets is also shown in FIG. 1. As can be seen, the air path has two generally 90 degree turns, which also increases the pressure drop across the panel.

An attempt to decrease the pressure drop, by maintaining a generally straight air flow path through a panel filter, but not a pocket panel filter, is described in U.S. patent publication No. US 2004-0187689 A1, which corresponds to PCT application WO 04/052504. This reference discloses a filter element having Z-filter media, which is composed of a plurality of media flutes. Such a construction can be cleaned by sending a reverse pulse of air through the Z-filter media. A representative product is available from Donaldson Company, Inc. under the designation "PowerCore XLR Panel Filter".

Although many products are available and function adequately, there is always room for improvements.

SUMMARY OF THE DISCLOSURE

The present disclosure is directed to a panel filter for filtering of a gas stream, such as an air stream. The panel filter has at least one V-pocket formed of two halves, each half composed of multiple pleats of filter media. The pleats extend generally parallel to the overall filtration path, so that air or gas to the filtered passes through the pleats in a generally straight manner, with minimal bends. Each pleat has two legs of different length. The panel filter provides improved dust collection and retention while restricting pressure drop.

An advantage of the panel filter of this disclosure is that the thickness of the media V-pocket can be reduced, as compared to conventional media V-pockets, allowing for less inlet and outlet passage area. Thus, more V-pockets can be present in the same panel filter width than prior.

In one particular aspect, this disclosure is to an air or gas panel filter that has at least one media V-pocket having a first half and a second half. Each half extends from the filter inlet side to the filter outlet side, and each half has a plurality of pleats, each having a first leg and a second leg. The first leg has a length different than the length of the second leg. The first leg and the second leg meet and form an internal angle at a closed end of the pleat and form an opposite open end. The closed end is position closer to the outlet side than the open end, and the open end is positioned closer to the inlet side than the closed end. The angle between the first leg and the second leg, may be less than 1 degree.

In another aspect, the disclosure is to an air or gas filter that has at least one media V-pocket having a first half and a second half, each half comprising a plurality of pleats. Each pleat has a first leg and a second leg, the first leg and the second leg meeting and forming an internal angle at a closed end and forming an opposite open end. Legs of adjacent pleats meet at the open end. The closed end is positioned closer to the outlet side than the open end, and the open end is positioned closer to the inlet side than the closed end. In some embodiments, each of the first leg and the second leg are no more than about 30 degrees from parallel to the inlet side and the outlet side of the filter, often no more than about 20 degrees and often no more than about 15 degrees.

Various other features of the filter elements and methods of using the elements are described below.

BRIEF DESCRIPTION OF THE DRAWINGS

Referring now to the drawings, wherein like reference numerals and letters indicate corresponding structure throughout the several views.

DETAILED DESCRIPTION

The present invention is directed to an air filter element, in particular, a panel filter, having a front face and a second face, where the air to be filtered passes through the front face and out the back face. More specifically, the present invention is directed to a pleated pocket panel filter.

The filter of the present invention is suitable for various applications where high loading, which then leads to pressure drop, is undesirable. Examples of such applications included, but are definitely not limited to, gas turbine applications, high purity applications such as clean rooms, internal combustion engine intakes, etc.

For filters according to the present invention, the air moves in a generally straight line, with minimal bends through the media.

Figure 2:
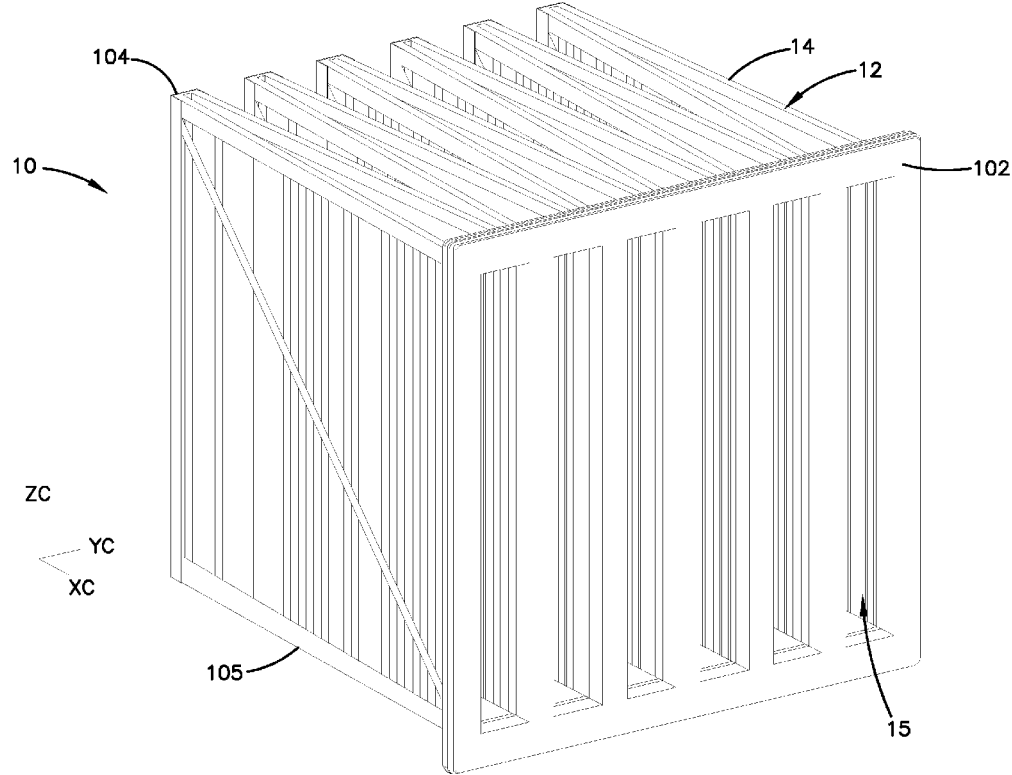
FIG. 2 is a perspective view of a pleated pocket panel filter according to the present disclosure.

FIG. 2 shows a panel filter 10 according to the present disclosure, filter 10 having a first end 102 and a second end 104. First end 102 is an inlet end for air to be filtered by filter 10, and second end 104 is an outlet for filter air. Filter 10 has a plurality of V-pockets 12, each V-pocket 12 having two halves 14, which define an interior 15. Access is gained to interior 15 at first end 102. V-pockets 12 are composed of pleated filter media, preferably supported by a frame, such as frame 105.

Frame 105 supports the multiple V-pockets 12 across the width of filter element 10. Typically, V-pockets 12 are arranged as illustrated in FIG. 2, with V-pockets 12 positioned across the width of filter 10, and each V-pocket 12 extending the height of filter 10. In FIG. 2, a coordinate axis is shown. The multiple V-pockets 12 extend across the width in the YC direction, and each V-pocket individually extends in the XC direction. A common size for a filter 10 suitable for a ventilation or gas turbine market is 61 cm (24 inches) wide and 61 cm (24 inches) tall. Filter 10 could have dimensions as small as about 30 cm (12 inches) and as large as about 250 cm (about 100 inches), with smaller and larger filters also being suitable for these and other applications.

As stated above, filter element 10 includes pleated filter media, arranged as "V-pockets" or "V-packs", each of the "V's" having two halves or portions. By use of the term "V", what is intended is two sections or portions of media, each portion comprising a plurality or multiplicity of folds or pleats, each of the pleats composed of legs. The two sections or portions meet or are joined to form a media construction having a generally "V" shape. Two sections or portions form the "V-pocket" or "V-pack".

Figure 3:
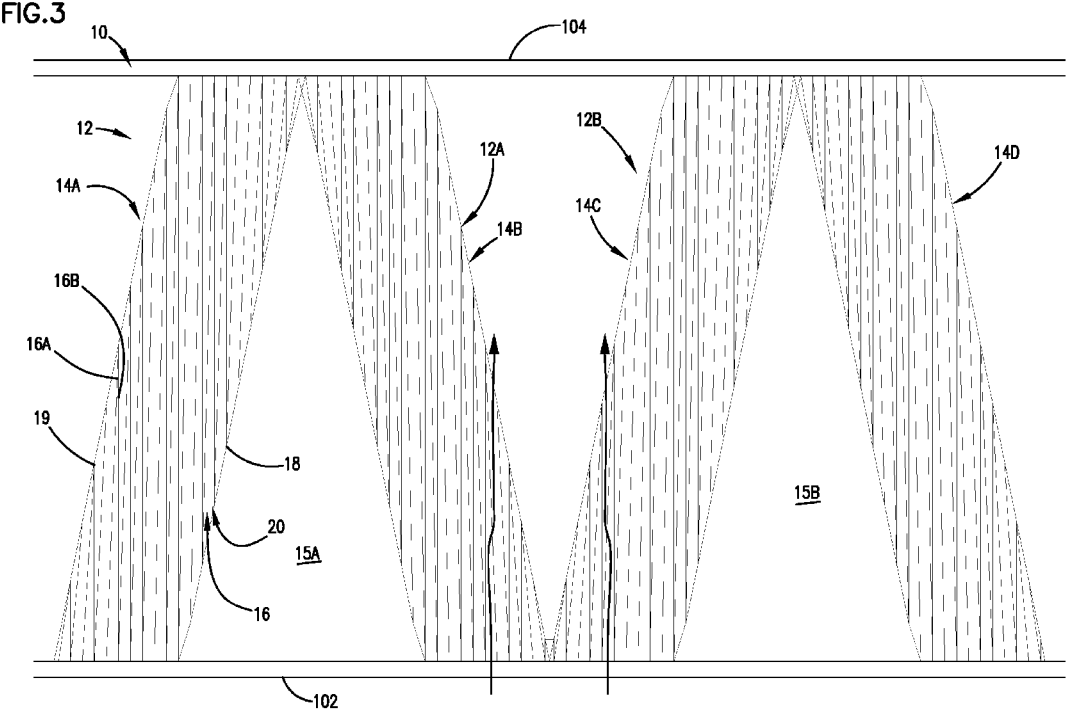
FIG. 3 is a schematic top view of a portion of the media of the pleated pocket panel filter according to the present disclosure.

Filter 10 has multiple V-pockets 12, and in FIG. 3 a first V-pocket 12A and a second V-pocket 12B are illustrated. Referring to FIG. 3, V-pocket 12A is composed of a first half 14A and a second half 14B, and V-pocket 12B is composed of a first half 14C and a second half 14D. Halves 14A, 14B define an interior 15A therebetween, and halves 14C, 14D define an interior 15B therebetween. The term "V-pocket" is derived from the interior 'pocket' between the two halves 14A, 14B and 14C, 14D.

The two halves 14A, 14B and 14C, 14D of the "V" are symmetrical and are mirror images of one another. That is, first half 14A is symmetrical and a mirror image of second half 14B, etc. By use of the term "symmetrical", what is intended is that if a central line were drawn through the center of V-pocket 12 from first end 102 to second end 104 of the filter element, one half 14A, 14B would be on each side of the central line, and each of halves 14A, 14B would be a mirror image of the other.

The angle formed by two pair halves 14, e.g., 14A and 14B, or 14C and 14D, is at least about 2 degrees and no more than about 90 degrees. In most embodiments, this angle, which may also be referred to as an interior angle or inlet angle, is about 9-45 degrees. Typically, the interior or inlet angle is about 9-20 degrees, or even 9-18 degrees. Of course, many factors will affect these angles, including pocket depth, pleat depth, and pleat angles.

Each of the halves or portions 14A, 14B, 14C, 14D is composed of a plurality of pleats 16, as seen in FIG. 3. Each pleat 16 has a first leg 16A and a second leg 16B. Legs 16A, 16B meet and join at tip 19 and form an interior angle α proximate tip 19. Tip 19 could be referred to as a closed end of pleat 16. Legs 16A, 16B from adjacent pleats 16 meet at join at tips 18. Between adjacent tips 18 is an open end 20. As seen in FIG. 3, tips 18 of multiple adjacent pleats 16 align, and tips 19 of multiple adjacent pleats 16 align.

Pleats 16, in particular legs 16A, 16B and open end 20, are arranged so that air to be filtered, entering from first end 102, has a generally straight path through filter 10 and through the media. Legs 16A, 16B are, in most part, generally parallel to the air flow and perpendicular to first end 102 of filter 10. Having pleats 16 arranged in such a manner decreases the pressure drop through the media, while maintaining a high dust loading capability.

Legs 16A, 16B are angled are no more than about 30 degrees from perpendicular to the inlet side (e.g., first end 102) and the outlet side (e.g., second end 104) of the filter, often no more than about 20 degrees and often no more than about 15 degrees. In many embodiments, legs 16A, 16B are positioned no more than about 10 degrees, even no more than about 5 degrees from being perpendicular to the inlet side (e.g., first end 102) and the outlet side (e.g., second end 104).

Figure 4:
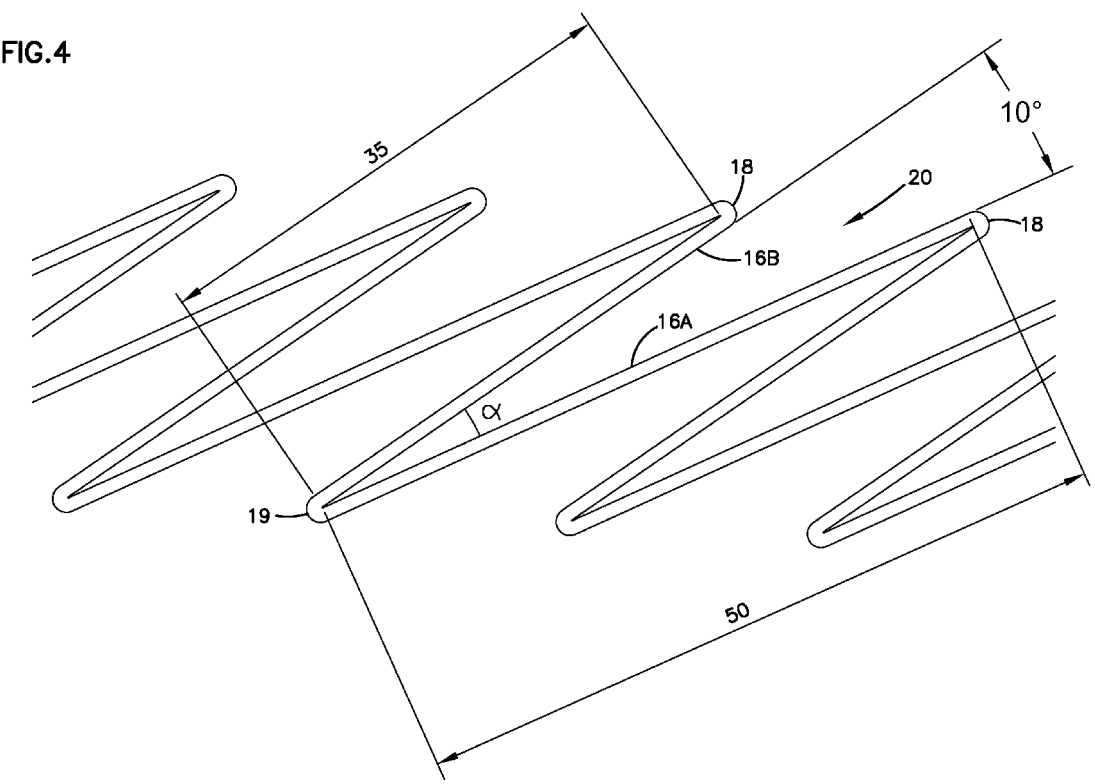
FIG. 4 is an enlarged schematic top view of a portion of the media of the pleated pocket panel filter according to the present disclosure.
Figure 5:
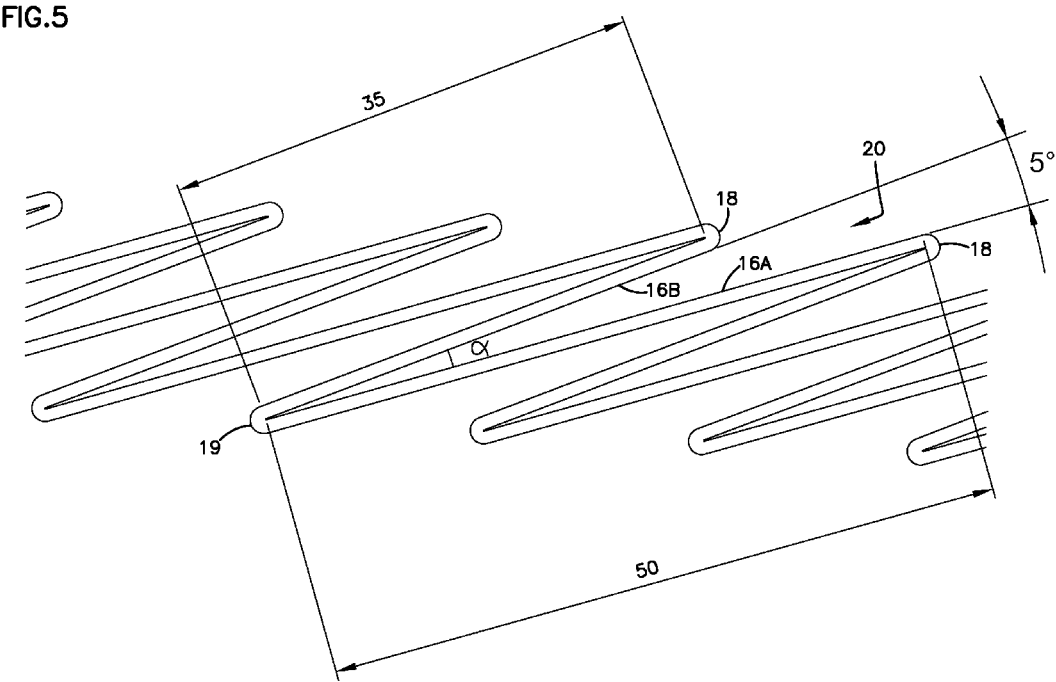
FIG. 5 is an enlarged schematic top view of a second embodiment of a portion of the media of the pleated pocket panel filter according to the present disclosure.

Referring to FIGS. 3, 4 and 5, and as indicated above, legs 16A, 16B meet and join at tip 19, and define an open end 20 there between. Legs 16A, 16B define an interior angle α. In order to have tips 18 and tip 19 align in a generally straight line, the length of legs 16A, 16B of pleat 16 are different; that is, legs 16A and 16B do not have the same length. The difference between legs 16A and 16B has an effect on angle α and also on the internal or interior angle of V-pocket 12.

As a general rule, each V-pocket 12 present in filter 10 will be the same as each other V-pocket 12. That is, the pleat depth, pleat density and pleat spacing will be the same for each V-pocket 12 in the filter element.

It is currently believed that lengths for legs 16A, 16B could be a little as 8 mm (about 0.3 inch) and as long as 10 cm (about 4 inches), although lengths of about 2-10 cm or 20-100 mm (about 0.8-about 4 inches) are common. Both FIGS. 4 and 5 illustrate a length of leg 16A as 50 mm (5 cm) and a length of leg 16B as 35 mm (3.5 cm). In many embodiments, the difference in length between leg 16A and leg 16B is at least about 2 mm, often at least about 5 mm. A difference in length is usually no more than 20 mm. A difference of about 10 mm is common, as is a difference of about 2-15 mm, and about 5-10 mm. In general, the longer legs 16A, 16B, the greater the possible difference therebetween. It should be understood that the preferred dimensions may change as development of the invention progresses.

Figure 6:
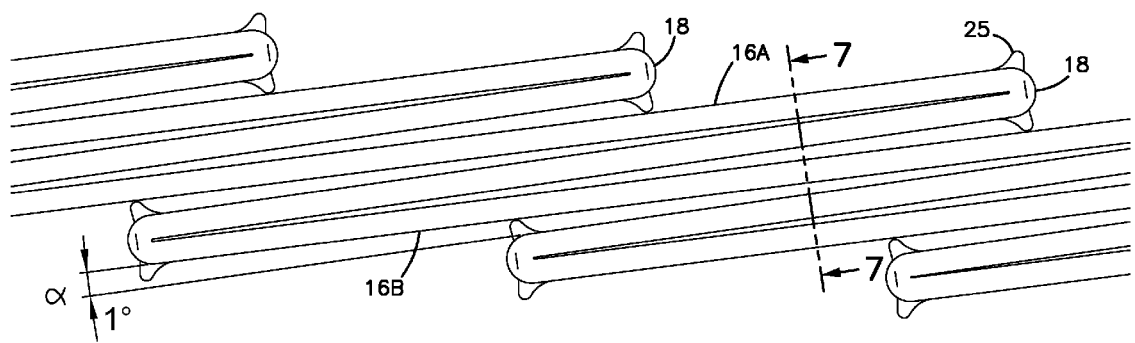
FIG. 6 is an enlarged schematic top view of a third embodiment of a portion of the media of the pleated pocket panel filter according to the present disclosure.

It is currently believed that pleat interior angle α, between legs 16A, 16B, can be any angle greater than 0 (zero) degrees up to about 45 degrees, although angles of less than 1 degree up to 15 degrees are currently being used for most embodiments. In some embodiments, interior angle α is less than about 1 degree, even less than about 0.75 degree. In some embodiments, a suitable range for interior angle α is less than 1 degree to 5 degrees. FIG. 4 illustrates an interior angle α of 10 degrees and FIG. 5 illustrates an interior angle α of 5 degrees. FIG. 6 illustrates an interior angle α of about 1 degree. Various angles are provided in the example section below. In general, angle α is not dependent only on the length of legs 16A, 16B, but the combination of the length of legs 16A, 16B and the angle of interior 15 between halves 14A and 14B of V-pocket 12. It should be understood that the preferred angle may change as development of the invention progresses, although it is preferred that each of legs 16A, 16B is generally parallel to, and usually at an angle of no more than about 15 degrees off, the direction of air flow through filter 10. That is, air passes through the filter media in a generally straight path, with little or no bend.

Figure 8:
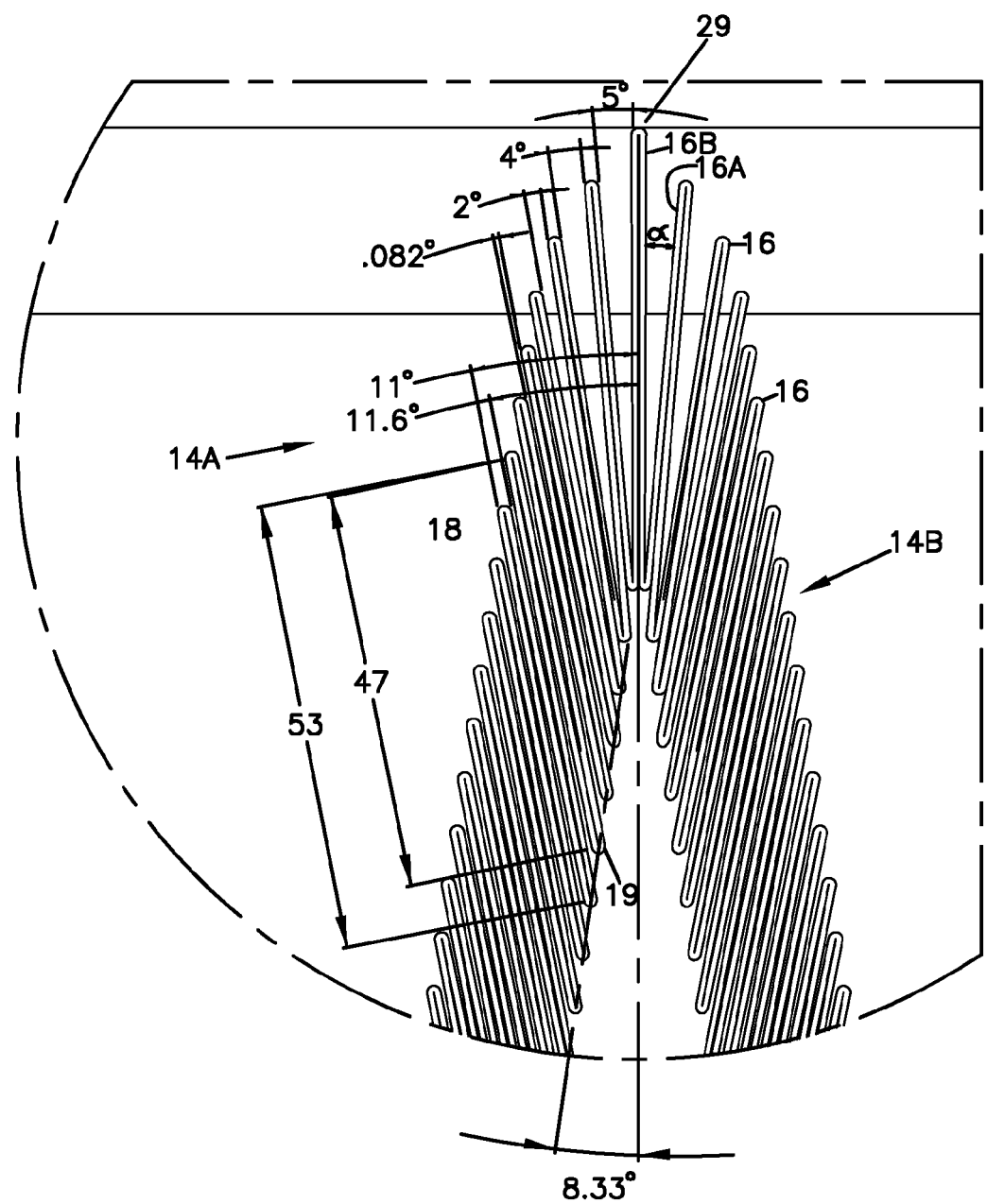
FIG. 8 is a schematic top view of a portion, specifically where two media halves meet, of the media of a pleated pocket panel filter according to the present disclosure.

Referring to FIG. 8, a tip 29 formed by halves 14A, 14B is illustrated. In this diagram, halves 14A, 14B are formed from a single media piece; that is, there is no break between first half 14A and second half 14B. As pleats 16 near tip 29, pleat interior angle α, between legs 16A, 16B changes, in order to facilitate making the media turn at tip 29. The particular details of this embodiment are: length of leg 16A is 53 mm and angle of leg 16A to pocket centerline is generally 11.6 degrees; length of leg 16B is 47 mm and angle of leg 16B to pocket centerline is generally 11 degrees; interior angle between halves 14A, 14B is 16.66 degrees (twice 8.33 degrees); pleat interior angle α between legs 16A, 16B includes from about 0.082 degrees to 2 degrees to 4 degrees to 5 degrees at tip 29.

Figure 1:
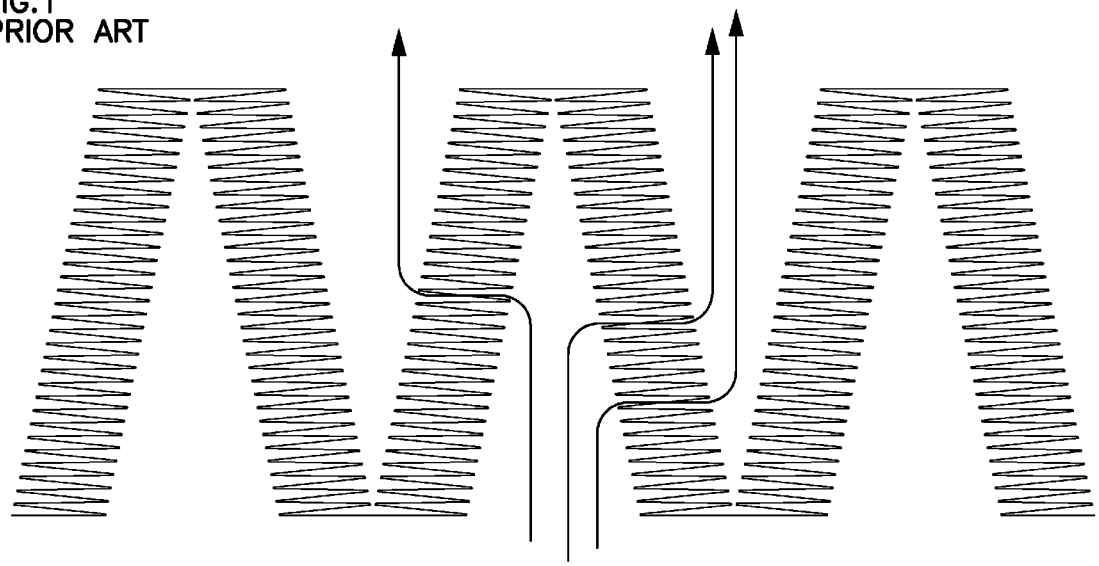
FIG. 1 is a schematic top view of a prior art pleated pocket panel filter element having constant height pleats.

Referring to FIG. 2, and to recap the statement above, air to be filtered passes through the filter media in a generally straight path in the XC direction, with little or no bend. Preferably, the air passing through filter 10 bends no more than about 45 degrees from its original path, more preferably no more than 35 degrees; typically the 'original path' is a line perpendicular to first end 102 and second end 104, in the direction of XC. In some embodiments, the air bends no more than about 30 degrees, about 20 degrees, or about 15 degrees. Bends of no more than 10 degrees and also no more than about 5 degrees can also be accomplished with filter 10. An example is illustrated in FIG. 3, when the air flow through filter 10 is illustrated having little deviation from being straight. In the prior art filter illustrated in FIG. 1, the air bends and moves in a direction analogous to direction YC of FIG. 2.

Altering the length of pleats 16 and angle α directly affects orientation of the half 14 and thus interior 15 of V-pocket 12, which is formed by the angle between two halves 14A, 14B. When the "angle between two halves", such as halves 14A, 14B is referred, to, what is meant is the angle formed by aligned tips 18 which generally define interior 15. Generally, the angle between halves 14, such as first half 14A and second half 14B (FIG. 3) is about 9 to about 20 degrees, although angles as small as about 3 degrees may be suitable, or angles are larges as about 45 degrees. It is noted that the angle of tips 18 and interior 15 may differ depending on whether or not a pre-filter is present upstream of filter element 10.

Pleat legs 16A, 16B have a pleat spacing or pleat density. The pleat density is generally dependent on the pleat depth (i.e., the length of legs 16A, 16B). A general pleat density is about 4 to 5 pleats per cm (about 10-13 pleats per inch) for pleats 16 having a length of about 2.5 cm (about 1 inch). At lower pleat depths, the preferred density increases to about 6 pleats per cm (about 15 pleats per inch), and at larger pleat depths, this decreases to about 3 pleats per cm (about 8 pleats per inch). The specific pleat depth and density will depend on the contaminant being removed and the filter element and filter media properties.

As seen in FIG. 6, a separation between the media of individual pleats 16 is present. Uniform spacing of pleats 16 and legs 16A, 16B is desired to achieve effective use of the media. To achieve and maintain optimal pleat density, the pleat spacing should be controlled. Several mechanisms are known in the pleated media art to provide the pleat separation and spacing.

In FIG. 6, beads of adhesive 25, such as hot melt or epoxy, are positioned between the pleats to maintain the spacing between adjacent pleats 16. These adhesive beads 25 may be placed between pleats 16 during the pleating process. Other suitable techniques include a post beading operation where hot melt is applied over the pleat tips of a previously pleated element, embossing dimples onto the media, printing raised surfaces onto the media, and co-pleating with a web of nodes. Hot melt adhesive beads are current the preferred pleat spacing technique, either applied during the pleating process or after.

In some embodiments, it may be desired to add a screen or liner against pleat legs 16A, 16B or media halves 14A, 14B, to provide protection against handling and to mitigate media distortion, for example, due to implosion due to excessive pressure drop. The screen or liner may be continuous or may have digits (e.g., resemble a comb with fingers). In some embodiments, a screen or liner clip may be present where pleat legs 16A, 16B join.

It will be understood by those skilled in the art of air or gas filtration, that the specific characteristics of filter 10, such as interior angle α and the angle of interior 15 between two halves 14A, 14B, the pleat density, the pleat depth, etc. will be dependent on the type of filtration media used, the desired air flow volume desired, the pressure drop desired through element 10, and the amount of dust to be collected. Other properties may also affect the filter characteristics.

All of V-pockets 12 of filter element 10 may be folded from a single sheet or piece of media material, or, multiple pieces of media may be used. For example, each V-pocket 12 could be made from a piece of media; thus, pleats 16 of first half 14A and pleats 16 of second half 14B would be continuous. As another example, each half 14, could be made from a piece of media; thus pleats 16 of first half 14A would not be continuous with pleats 16 of second half 14B. As yet another example (see FIG. 3), second half 14C from V-pocket 12A and third half 14C from V-pocket 12B could be made from a piece of media. Other arrangements, such as a piece of media being used to form two V-pockets 12, such as V-pocket 12A and V-pocket 12B (i.e., halves 14A, 14B, 14C, 14D), are foreseen.

The filter media for pleats 16 may be any known filter media, such as cellulose, polymeric materials (e.g., viscose, polypropylene, polycarbonate, etc.), glass or fiberglass, natural materials (e.g., cotton), or any combination thereof. The media may be a HEPA media material, which provides high filtration efficiency. HEPA media has a minimum efficiency of 85% removal when tested with essentially monodispersed 0.3 micron particles, and often has a minimum efficiency of 99.97%. Any filter media may be electrostatically treated and/or include one or more layers of material. One or more layers of fine fiber or nanofibers, such as taught by, for example, U.S. Pat. No. 6,673,136 (Gillingham et al.), may be included within or on the filter media.

Figure 7:
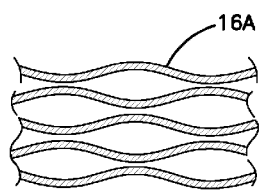
FIG. 7 is cross-sectional view of the filter media taken along line A-A of FIG. 6.

The filter media may be generally planar or may be dimpled, pleated or corrugated. FIG. 7 illustrates an enlarged portion of filter media, showing a wavy or corrugated media.

SPECIFIC EXAMPLES

The following examples provide specific examples of lengths, angles, etc. for filter 10.

Example 1: The Example 1 filter had six V-pockets 12, each V-pocket 12 having interior 15 with an angle between first half 14A and second half 14B of 6.10 degrees, or, 3.05 degrees from a centerline between first half 14A and second half 14B. Each half 14A, 14B had 40 pleats 16. Each pleat's first leg 16A had a length of 50 mm, second leg 16B had a length of 44.03 mm, with angle α of 0.62 degrees between legs 16A, 16B. The depth of each V-pocket 12 from first side 102 to second side 104 was 8 mm. The angle between first leg 16A and a line extending through the center of V-pocket 12, evenly between first half 14A and second half 14B was 8.27 degrees. The angle between second leg 16B and the center line was 8.89.

Examples 2-23 were similar to Example 1, except having the parameters defined in Table 1, below. For convenience, the parameters of Example 1 are also included in

TABLE 1

| Ex. | No. of V-pockets | Half angle of V-pocket | First leg 16A (mm) | Second leg 16B (mm) | Angle α | Depth of V-pack | Angle to horizontal: leg 16A | Angle to horizontal: leg 16B | No. pleats |
|---|---|---|---|---|---|---|---|---|---|
| 1 | 6 | 3.05 | 50 | 44.03 | 0.62 | 8 | 8.27 | 8.89 | 40 |
| 2 | 6 | 3.05 | 50 | 37.06 | 0.62 | 10 | 10.5 | 11.12 | 42 |
| 3 | 6 | 3.05 | 50 | 40.23 | 0.62 | 11 | 11.75 | 12.37 | 53 |
| 4 | 6 | 3.05 | 125 | 68.7 | 2.9 | 12 | 5.14 | 8.04 | 9.5 |
| 5 | 6 | 3.05 | 50 | 41.1 | 0.62 | 12 | 13 | 13.62 | 64 |
| 6 | 6 | 3.05 | 50 | 42.43 | 0.2 | 12 | 13 | 13.25 | 56 |
| 7 | 6 | 3.05 | 50 | 41.74 | 0.62 | 15 | 16.5 | 17.12 | 63 |
| 8 | 6 | 3.05 | 50 | 43.93 | 0.62 | 17 | 18.85 | 19.47 | 83 |
| 9 | 6 | 3.05 | 50 | 44.98 | 0.62 | 20 | 22.51 | 23.13 | 99 |
| 10 | 5 | 3.89 | 50 | 36.3 | 0.62 | 8 | 8.27 | 8.89 | 40 |
| 11 | 5 | 3.89 | 50 | 39.18 | 0.62 | 10 | 10.59 | 11.21 | 54 |
| 12 | 5 | 3.89 | 50 | 41.1 | 0.62 | 12 | 12.92 | 13.54 | 65 |
| 13 | 5 | 3.89 | 50 | 43.02 | 0.62 | 15 | 16.46 | 17.08 | 82 |
| 14 | 5 | 3.89 | 50 | 43.93 | 0.62 | 17 | 18.85 | 19.47 | 92 |
| 15 | 5 | 3.89 | 50 | 44.98 | 0.62 | 20 | 22.51 | 23.13 | 109 |
| 16 | 5 | 3.89 | 50 | 46.19 | 0.62 | 25 | 28.82 | 29.44 | 136 |
| 17 | 4 | 5.39 | 50 | 41.1 | 0.62 | 12 | 12.92 | 13.54 | 65 |
| 18 | 4 | 5.39 | 50 | 47.06 | 0.62 | 30 | 35.52 | 36.14 | 156 |
| 19 | 4 | 5.39 | 50 | 47.73 | 0.62 | 35 | 42.82 | 43.44 | 190 |
| 20 | 3 | 7.69 | 50 | 46.19 | 0.62 | 25 | 28.82 | 29.44 | 135 |
| 21 | 3 | 7.69 | 50 | 47.06 | 0.62 | 30 | 35.52 | 36.14 | 156 |
| 22 | 3 | 7.69 | 50 | 47.73 | 0.62 | 35 | 42.82 | 43.44 | 190 |
| 23 | 3 | 7.69 | 50 | 48.3 | 0.62 | 40 | 51.08 | 51.7 | 212 |

Methods of Using the Filter

Filter element 10 particularly suitable for use in applications where high unit area filtration, large air flow, low filter weight, or any combination of these features is desired. An example application is for power generation applications, particularly gas turbines. In use, air or other gas to be filtered is passed through filter 10 from first side 102 to second side 104, through the media.

Referring to FIGS. 2 and 3, air or gas to be filtered by filter element 10 enters filter element 10, specifically V-pockets 12 via interior 15. As described above, each V-pocket 12 has a plurality of pleats 16, which have open end 20. The air to be filtered enters pleats 16 via open end 20, and then passes through the media, where contaminants are removed. The cleaned air exits filter 10 at second side 104.

After sufficient use, such as when pleats 16 of filter 10 becomes sufficiently occluded or unacceptable levels of pressure drop are encountered, filter 10 can be removed and replaced with another element 10.

It is to be understood, however, that even though numerous characteristics and advantages of the present invention have been set forth in the foregoing description, together with details of the structure and function of the invention, the disclosure is illustrative only, and changes may be made while remaining within the principles of the invention. It is understood that the length of the pleats may be longer or shorter than described herein, that the density of the pleats may be more or less than described herein, and that filter shapes, other than rectangular panels, could be made. For example, cylindrical filter elements may benefit from having pleats having legs of two different lengths. In such a configuration, however, the gas flow, either from in-to-out or out-to-in would take an angled path. Other applications for the pleats of this disclosure can be contemplated.

What is claimed:

1. A gas filter comprising:
    (a) an inlet side and an outlet side, which are parallel to each other;
    (b) at least one media V-pocket having a first half and a second half, each half:
        (i) extending from the inlet side to the outlet side;
        (ii) comprising a plurality of pleats having a first leg and a second leg, the first leg having a length different than a length of the second leg; the first leg and the second leg meeting and forming an internal angle at a closed end and forming an opposite open end, the closed end positioned closer to the inlet side than the open end, and the open end positioned closer to the outlet side than the closed end, the first leg and the second leg of each pleat being at an angle of no more than 30 degrees from perpendicular to the inlet side and the outlet side; and
    (c) the first and second halves converging at the outlet side and forming an inlet angle.

2. The filter according to claim 1, wherein the first leg and the second leg of the pleat form an internal angle of less than 5 degrees therebetween.

3. The filter according to claim 1, wherein the first leg and the second leg of the pleat form an internal angle of less than 1 degree therebetween.

4. The filter according to claim 1, wherein the first and second halves form an inlet angle of 5 to 35 degrees therebetween.

5. The filter according to claim 1, wherein the first and second halves form an inlet angle of 10 to 20 degrees therebetween.

6. The filter according to claim 1, wherein the length of the second leg is about 2 mm to about 15 mm more than the length of the first leg.

7. The filter according to claim 1, wherein the length of the second leg is at least about 5 mm more than the length of the first leg.

8. The filter according to claim 1, wherein the first leg and the second leg are no more than 20 degrees from perpendicular to the inlet side and/or the outlet side.

9. The filter according to claim 1, wherein the first leg and the second leg are no more than 10 degrees from perpendicular to the inlet side and/or the outlet side.

10. A gas filter comprising:
   (a) an inlet side and an outlet side, the inlet side configured for receiving air or gas to be filtered, and the outlet side providing filtered gas;
   (b) at least one media V-pocket having a first half and a second half, the first and second halves converging at the outlet side and forming an inlet angle, each half comprising a plurality of pleats having a first leg and a second leg, the first leg and the second leg meeting and forming an internal angle at a closed end and forming an opposite open end, the closed end positioned closer to the inlet side than the open end, and the open end positioned closer to the outlet side than the closed end, the first leg and the second leg forming an internal angle of less than 10 degrees therebetween, and each of the first leg and the second leg of each pleat being no more than 45 degrees from perpendicular to the inlet side and the outlet side.

11. The filter according to claim 10, wherein the first leg having a first length and the second leg having a second length different than the first length.

12. The filter according to claim 10, wherein the second length is about 2 to 15 mm more than the first length.

13. The filter according to claim 10, wherein the first leg and the second leg of the pleat form an internal angle of less than 1 degree therebetween.

14. The filter according to claim 10, wherein the first leg and the second leg of the pleat form an internal angle of less than 5 degrees therebetween.

15. The filter according to claim 10, wherein the first and second halves form an inlet angle of 5 to 35 degrees therebetween.

16. The filter according to claim 10, wherein the first and second halves form an inlet angle of 10 to 20 degrees therebetween.

17. A method of filtering a gas comprising:
   (a) passing a dirty gas stream through a gas filter comprising an inlet side and an outlet side having a media V-pocket comprising a first half and a second half that converge at the outlet side to form an inlet angle, each half comprising a plurality of pleats having a first leg with a first length and a second leg with a second length different than the first length, and an internal angle of less than 5 degrees therebetween, with each of the first leg and the second leg at an angle of less than 30 degrees from perpendicular to the inlet side and the outlet side of the gas filter;
   (b) passing the dirty gas stream through one of the first leg and the second leg to remove contaminants from the dirty gas stream; and
   (c) obtaining a cleansed gas stream.

18. The method of claim 17 wherein passing a dirty gas stream through an inlet of a media V-pocket comprises:
   (a) passing a dirty gas stream through the inlet of a media V-pocket comprising an internal angle of less than 1 degree therebetween, with each of the first leg and the second leg at an angle of less than 5 degrees from perpendicular to the inlet of the media V-pocket.

\* \* \* \* \*